(12) United States Patent
Hanna

(10) Patent No.: US 9,051,914 B1
(45) Date of Patent: Jun. 9, 2015

(54) HYDRODYNAMIC ENERGY GENERATION SYSTEM WITH DUAL FLUID ENTRY SYSTEM

(71) Applicant: Ibrahim Hanna, Miami, FL (US)

(72) Inventor: Ibrahim Hanna, Miami, FL (US)

( * ) Notice: Subject to any disclaimer, the term of this patent is extended or adjusted under 35 U.S.C. 154(b) by 0 days.

(21) Appl. No.: 14/515,101

(22) Filed: Oct. 15, 2014

Related U.S. Application Data

(63) Continuation-in-part of application No. 14/258,716, filed on Apr. 22, 2014, which is a continuation-in-part of application No. 14/195,133, filed on Mar. 3, 2014.

(60) Provisional application No. 61/925,828, filed on Jan. 10, 2014.

(51) Int. Cl.
*F03B 13/10* (2006.01)
*F03B 17/00* (2006.01)

(52) U.S. Cl.
CPC .............. *F03B 13/10* (2013.01); *Y10S 415/916* (2013.01); *F03B 17/005* (2013.01)

(58) Field of Classification Search
CPC ........ H02K 7/1823; H02K 7/18; Y02E 10/22; Y02E 10/28
USPC .................. 290/52, 53, 54; 415/1, 182.1, 201
See application file for complete search history.

(56) References Cited

U.S. PATENT DOCUMENTS

| | | | |
|---|---|---|---|
| 7,329,962 B2 * | 2/2008 | Alstot et al. | 290/54 |
| RE40,407 E * | 7/2008 | Natarius | 210/788 |
| 8,400,007 B2 * | 3/2013 | Campbell | 290/54 |
| 2007/0284883 A1 * | 12/2007 | Cafariello | 290/54 |
| 2009/0273189 A1 * | 11/2009 | Iglesia | 290/54 |
| 2010/0253080 A1 * | 10/2010 | DeAngeles | 290/52 |
| 2011/0260460 A1 * | 10/2011 | Rovinsky | 290/54 |
| 2011/0272498 A1 * | 11/2011 | Li et al. | 239/583 |
| 2012/0200156 A1 * | 8/2012 | Weller | 307/21 |
| 2013/0341928 A1 * | 12/2013 | Steelberg et al. | 290/53 |

* cited by examiner

*Primary Examiner* — Tulsidas C Patel
*Assistant Examiner* — Sean Gugger
(74) *Attorney, Agent, or Firm* — Mark Terry

(57) ABSTRACT

The hydrodynamic energy generation system includes a housing at least partially submerged in a body of water, a first valve at a top of the housing for regulating an amount of water that enters a first opening at the top and falls into the housing, a generator that produces electrical power when water falls through a turbine under the first opening, a reservoir located below the turbine of the generator, a second valve for regulating an amount of water that enters a second opening, an internal water jet that discharges water from the second valve, a gear mechanically coupled to the external water jet wherein the gear is moved by water expelled from the internal water jet, and an external water jet for expelling water from the reservoir.

19 Claims, 5 Drawing Sheets

HYDRODYNAMIC ENERGY GENERATION SYSTEM WITH DUAL FLUID ENTRY SYSTEM

CROSS-REFERENCE TO RELATED APPLICATIONS

This patent application is a continuation in part and claims priority to utility patent application Ser. No. 14/258,716 filed Apr. 22, 2014 and entitled "Hydrodynamic Energy Generation System with Energy Recovery and Levering System", which is a continuation in part and claims priority to utility patent application Ser. No. 14/195,133 filed Mar. 3, 2014 and entitled "Hydrodynamic Energy Generation System", which claims priority to provisional patent application No. 61/925,828 filed Jan. 10, 2014 and entitled "Hydrodynamic Energy Generation System." application Ser. Nos. 14/258,716, 14/195,133 and 61/925,828 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of energy production, and more specifically relates to the field of energy production via hydrodynamic sources.

BACKGROUND OF THE INVENTION

A power generating station is an industrial machine or plant for the generation of mechanical, hydrodynamic or electric power. At the center of nearly all power generating stations is a generator, which typically includes a rotating machine that converts mechanical power into electrical power by creating relative motion between a magnetic field and a conductor. The energy source harnessed to turn the generator varies widely—from moving water and wind, to fossil fuels (such as coal, oil, and natural gas) and nuclear material. In recent times, however, due to the decreasing reserves of fossil fuels and the environmental impact of their use in power generation, cleaner alternatives for the generation of power have become more popular.

Cleaner alternatives for power generation include solar, wind, wave, and geothermal sources. Despite the fact that they are considerably more environmentally-friendly, these alternative power generation techniques have struggled to gain widespread acceptance due to their inefficiencies in generating power, their high cost to establish in comparison to existing fossil fuel technology and their lack of aesthetic appeal (such as wind farms). Another reason for the lack of popularity of cleaner power generation alternatives is the political power of the existing power generation entities. Oil companies, for example, have significant political sway in the United States, as well as abroad, and have resisted attempts to introduce alternative fuel sources into the power generation industry.

One of the most promising clean power generation alternatives is hydroelectric power. Hydroelectricity refers to electricity generated by hydropower, i.e., the production of electrical power through the use of the gravitational force of falling, or hydrodynamic force of flowing, water. Although hydroelectric power is one of the cleanest and most environmentally-friendly sources of energy, it also has the capability to alter or damage its surroundings. In some forms of present use, among the main problems that have been demonstrated by hydroelectric power is significant change in water quality. Because of the nature of hydroelectric systems, the water used in the system can often take on a higher temperature, lose oxygen content, experience siltation, and gain in phosphorus and nitrogen content. This can have a major impact on aquatic life near the region of a hydroelectric plant.

Another major problem with hydroelectric power is the obstruction of a body of water, such as a river, for aquatic life. When used in the context of a flowing body of water, such as a river, a hydroelectric plant can obstruct the natural migration of aquatic life. Salmon, for example, which migrate upstream to spawn every year, are especially impacted by hydroelectric dams.

Therefore, a need exists to overcome the problems with the prior art as discussed above, and particularly for a more efficient way of providing cleaner and more environmentally friendly alternatives for power generation, namely, hydroelectric power generation.

SUMMARY OF THE INVENTION

A hydrodynamic energy generation system is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the hydrodynamic energy generation system includes a housing comprising a hollow interior, a first opening at a top of the housing and a second opening below the first opening, wherein the housing is at least partially submerged in a body of water, a first valve coupled to a top of the housing for regulating an amount of water that enters the first opening at the top and falls into the housing, wherein the first valve is located at or under a water line, a generator that produces electrical power when a turbine is moved by water entering from the first valve, a reservoir located below the turbine and within the housing, wherein the reservoir holds the water that has traveled via the turbine, a second valve coupled to the housing for regulating an amount of water that enters the second opening and falls into the housing, wherein the second valve is located under a water line, an internal water jet that discharges water from the second valve, a gear located adjacent to the internal water jet and within the housing, wherein the gear is mechanically coupled to an external water jet, and wherein when the gear is moved by water expelled from the internal water jet, and an external water jet located within the reservoir, wherein the gear powers the external water jet, and wherein the external water jet configured for expelling water from the reservoir to an exterior of the reservoir.

The foregoing and other features and advantages will be apparent from the following more particular description of the preferred embodiments, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
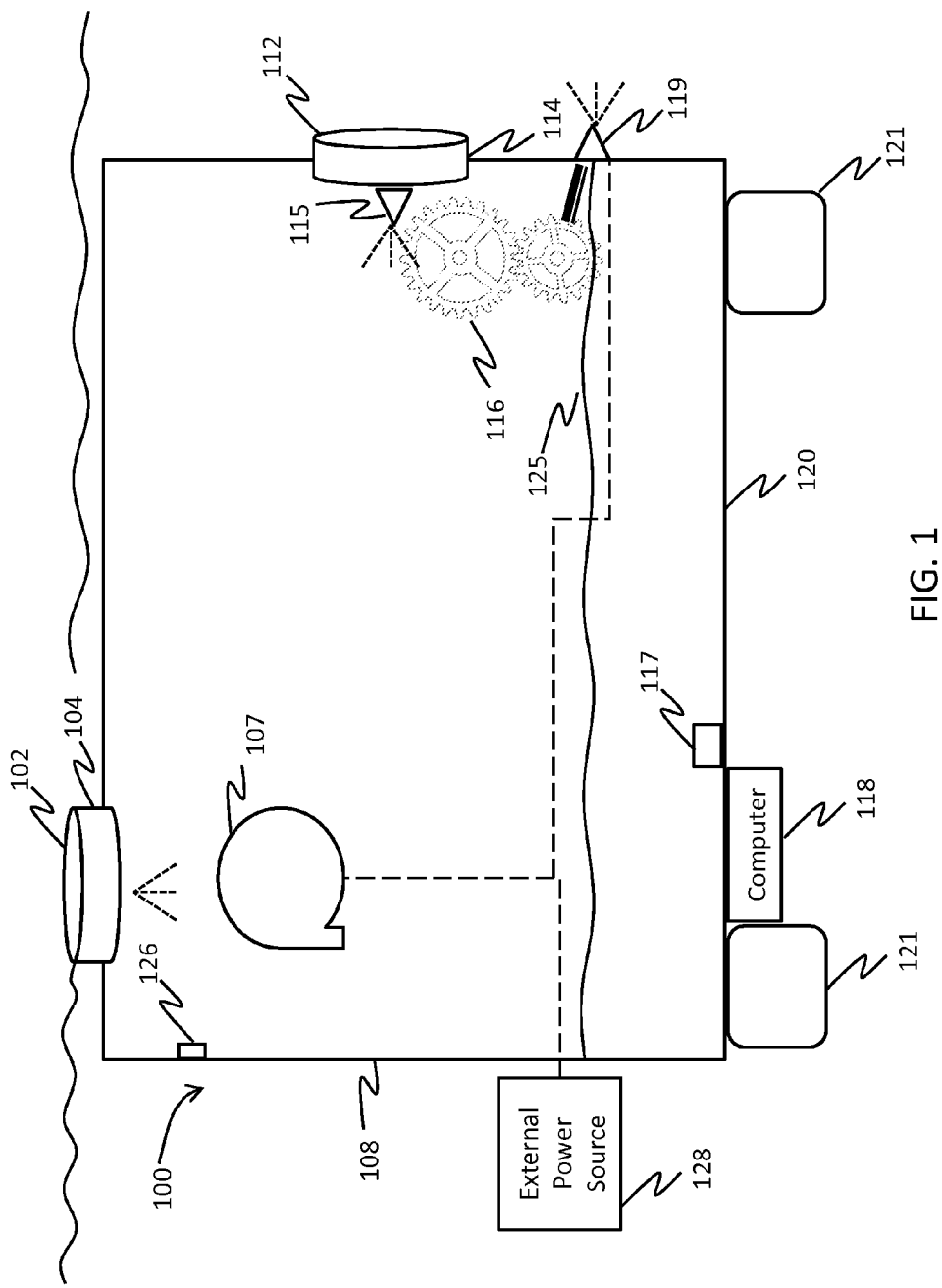
FIG. 1 is a block diagram illustrating the hydrodynamic energy generation system, in accordance with one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, a hydrodynamic energy generation system is disclosed that overcomes the problems with the prior art as discussed above, by providing an energy generation system that utilizes clean, renewable energy and does not produce waste. As an improvement over conventional energy generation systems, the disclosed systems allows for the production of energy using falling water that is plentiful and renewable, without the drawbacks of burning fossil fuels—i.e., waste products. Also, the hydrodynamic energy generation system provides a system with a minimal number of component parts, thereby reducing the potential for failure or malfunction of its combination parts. Further, the minimal number of component parts allows for quick and inexpensive fabrication of the combination parts, thereby resulting in an economical system. Lastly, the hydrodynamic energy generation system is easily maneuverable, easily transportable, inexpensive to manufacture and lightweight in its physical characteristics.

The embodiments of the hydrodynamic energy generation system will be described heretofore with reference to FIGS. 1 through 5 below. FIG. 1 is a block diagram illustrating the hydrodynamic energy generation system 100, in accordance with one embodiment. The hydrodynamic energy generation system 100, which is fully or partially submerged in a body of water (such as an ocean, lake or river) may be composed of a housing 108 comprising a hollow interior and an opening 102 at the top, in addition to a valve 104 for regulating the amount of water that enters the opening 102. The housing 108 may comprise various different shapes, such as a box-like shape, a tubular structure, or, alternatively, integrate a horizontal part or different portions in a variety of sequences or configurations. The opening 102 and/or valve 104 may be located at or under the water line of the body of water in which the system 100 is submerged, so as to allow water to enter the top of the housing 108. The housing 108 may also include a second opening 112 and a second valve 114 located below the height of the opening 102 and/or valve 104. Since the system 100 has two openings 102, 112 for allowing entry of water into the system, the system 100 can be said to be a dual or single fluid entry system, based on the stage of operation.

The valve 104 is coupled to the top of the housing 108 for regulating an amount of water that enters the opening 102 at the top, and the valve 114 coupled to the housing 108 for regulating an amount of water that enters the opening 112. The valves 104, 114 may comprise one or more valves for regulating flow of water, such as a ball valve, a butterfly valve, a gate valve, a globe valve, a needle valve, a spool valve or a safety valve. The valves 104, 114 may further be a check valve or foot valve, which are unidirectional valves that only allow water to flow in one direction.

The hydrodynamic energy generation 100 may further include an internal water jet 115 for shooting or jettisoning a jet of water or another liquid from valve 114 into the housing 108. The internal water jet 115 may be a water jet or a variant of equivalent function, such as using pressurized steam or air in a dedicated and closed circuit within the system. The water jet 15 may shoot or jettison water using the natural head pressure of water under the surface of the body of water or may be a simple turbine or water wheel mechanically chained to drive the gear. The water jet 15 may shoot or jettison water from the valve 114, or water from another location within system 100 or from an exterior location. The water jet 115 may shoot or jettison water that has been transferred to the jet via a pipe or a conveyance mechanism, wherein movement of the water is provided by a pump.

The hydrodynamic energy generation 100 may further include a gear 116 (or a water wheel and/or turbine) that is chained or otherwise mechanically coupled with water jet 119. A gear may comprise one or more gears or other mechanical components. As the jettisoned water interacts with the gear 116, the gear rotates or moves, thereby generating power. Thus, the gear 116 produces power when the gear 116 or water wheel and/or turbine is moved by the water jettisoned from the water jet 115. The gear 116 or water wheel and/or turbine may comprise a rotating machine that converts hydrodynamic power into mechanical power. The amount of power generated by gear 116 is proportional to the amount of water jettisoned from water jet 115 and is further proportional to the distance from the opening 112 to the gear 116 and also proportional to the relative size of the disk component of the gear.

The hydrodynamic energy generation 100 may further include a generator 107, with a water wheel and/or turbine located below the valve 104. As the water entering opening 102 interacts with the water wheel and/or turbine, it gear rotates or moves, thereby moving the components of the connected generator 107, which generates energy. Thus, the generator 107 produces electrical power when the water wheel and/or turbine is moved by the water entering from opening 102. The generator 107 may comprise a rotating machine that converts hydrodynamic power into mechanical power that drives the generator 107, which produces electrical power. The amount of power generated by the generator 107 is proportional to the amount of water entering opening 102 and is further proportional to the distance from the opening 102 to the generator.

The hydrodynamic energy system 100 may further include a reservoir 120 located below the valves, gears, and generators, wherein the reservoir 120 holds water that has traveled via the openings 102, 112. The reservoir 120 may comprise a volume that extends horizontally past a horizontal width of the housing 108. For example, reservoir 120 may have various different shapes, such as a horizontally aligned tubular structure that extends in the horizontal direction far past the horizontal width of the vertically aligned housing 108.

The system may further include at least one external water jet 119 for jettisoning water from the reservoir 120. The water jet 119 may be located in various different locations of the housing, such as in a horizontal direction past a horizontal width of the housing 108. The water jet 119 may further comprises components that are located within and without the housing 108. The purpose of water jet 119 is to maintain a predefined amount of water 125 in the reservoir 120, so as to neutralize, or substantially reduce or eliminate buoyancy forces acting on the system 100 components. The water jet 119 operates so as to not allow the amount of water 125 to rise over a predefined horizontal line, for the purpose of counteracting buoyancy forces acting on the system 100 components. Another purpose or function of water jet 119 is to ensure that the amount of water being pumped out of the housing 108 is equal to or greater than the amount of water entering the housing 108 via the openings 102, 112, so as to avoid a situation where the entire volume of housing 108 is filled with water. Another purpose or function of water jet 119 may be to ensure that the amount of energy exerted on the water being pumped out of the housing 108 is enough to maintain water flow equal to or greater than the amount of water entering the housing 108 via the openings 102, 112, so as to avoid a situation where the entire volume of housing 108 is filled with water, thereby causing a decrease in efficiency or system halt, and when this occurs, an outside energy source is needed to lower the interior water level to resume operation.

FIG. 1 shows that gear 116 may be communicatively coupled or mechanically coupled with water jet 119 such that the gear provides power to the jet 119 to engage in jettisoning water from the reservoir 120. The water jet 119 may further be communicatively coupled with generator 107 and an external power source 128, which would be an external source of power, such as the utility power grid or another power producer. The water jet 119 or any other item of system 100 that requires electricity can be powered via an exterior power source. In the event the system 100 is a net consumer of energy, the system 100 has the utility identical in certain dynamics to a pumped storage hydroelectricity system. However the disclosed system is different in that, due to the installation under the surface of a body of water, pumping water does not require more energy, when the elevation between the level of storage (or water return level) and the level of pumping is increased. As is well known in the art, pumped-storage hydroelectricity is a net consumer of energy and yet has a known utility. Pumped-storage hydroelectricity (PSH) is a type of hydroelectric energy storage used by electric power systems for load balancing. The method stores energy in the form of gravitational potential energy of water, pumped from a lower elevation reservoir. Low-cost off-peak electric power is used to run the pumps. During periods of high electrical demand, turbines produce electric power. Although the losses of the pumping process makes the plant a net consumer of energy overall, the system increases revenue by selling more electricity during periods of peak demand, when electricity prices are highest. This same utility may apply to system 100.

In above ground installations of PSH systems, pumping water to higher levels of storage consumes higher energy, and remains at all times energy net negative. In the disclosed system, however, while higher energy in deeper systems may be obtained from water falling through opening 102, pumping a fixed amount of water out of the system consumes a similar amount of energy at different levels of depth, thereby giving rise to the potential that at a certain depth, the energy produced may exceed energy consumed. In the disclosed system, if the falling water produces more energy as we the system is deployed in a deeper depth and when discharging this falling water consumes the same amount of energy regardless of depth, then the disclosed system may at a certain depth reach the level of being a net producer of energy.

The system 100 may further include a first sensor 126 for detecting water flow as water falls into the housing 108 via the openings 102, 112. The first sensor 126 may be an accelerometer, a water flow sensor, a temperature sensor, a conductance measurement device, a barometer, a pressure sensor, etc. The system 100 may also include a second sensor 127 for detecting an amount of water 125 in the reservoir 120. The second sensor 127 may be an accelerometer, a water flow sensor, a temperature sensor, a conductance measurement device, a barometer, a pressure sensor, etc. In FIG. 1, the first and second sensors 126, 127 may be one integrated unit or may comprise a plurality of sensors distributed throughout the system 100 in different locations.

Figure 2:
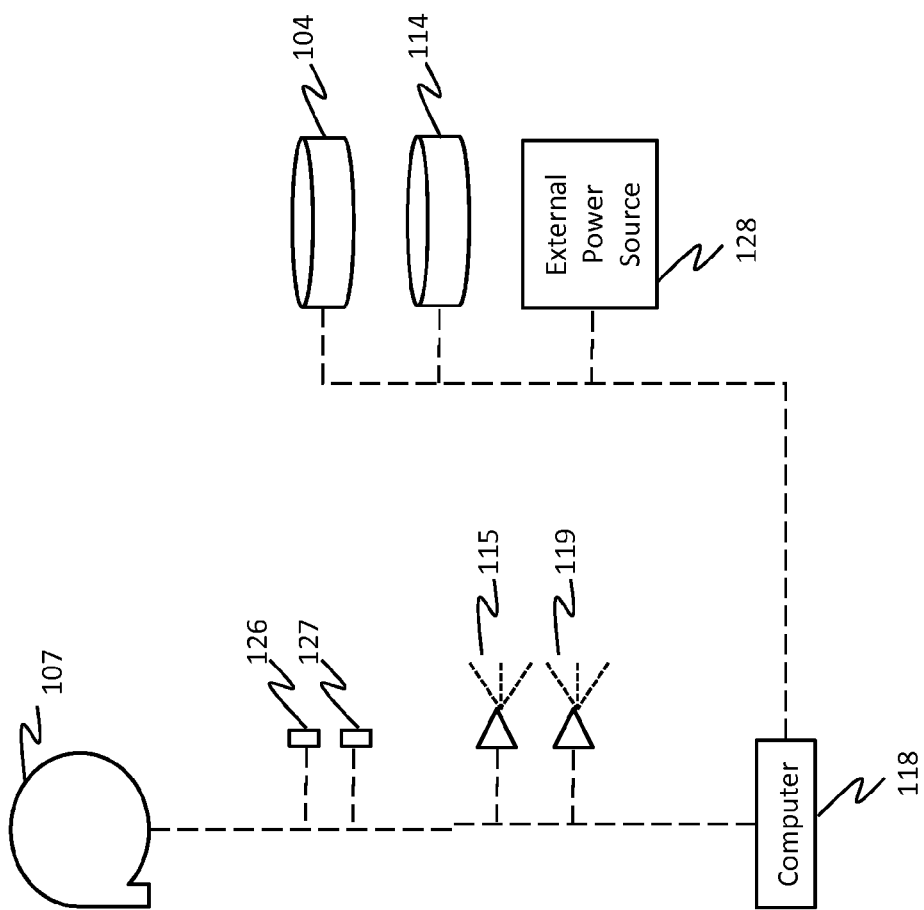
FIG. 2 is a block diagram illustrating the hydrodynamic energy generation system, in accordance with an alternative embodiment.

The hydrodynamic energy generation 100 may further include a computer or control processor 118. As shown in FIG. 2, the computer 118 may be communicatively coupled with valves 104, 114, generator 107, jets 115, 119, and first and second sensors 126, 127, as well as external power source 128. In one embodiment, processor 118 may be a central processing unit, microprocessor, integrated circuit, programmable device or computing device, as defined below with reference to FIG. 4. The control processor 118 is configured for reading data from valves 104, 114, generator 107, jets 115, 119, and first and second sensors 126, 127 and sending control signals to valves 104, 114, and jets 115, 119, wherein the control signals are configured to activate the valves to regulate an amount of water that enters the openings 102, 112 at the top of housing 108, and to activate the jets 115, 119 to regulate an amount of water maintained in the reservoir 120, such that the system 100 is maintained at neutral buoyancy. The control signals sent to the valves 104, 114, and jets 115, 119, may further be configured such that the amount of water 125 within reservoir 120 is not to be allowed to rise over a predefined line, for the purpose of substantially reducing or eliminating buoyancy forces acting the system 100 components due to the body of water in which the system 100 is submerged. The control signals sent to the valves 104, 114, and jets 115, 119, may also be configured such that the amount of water being pumped out of the housing 108 is equal to or greater than the amount of water entering the housing 108 via the openings 102, 112, so as to avoid a situation where the entire volume of housing 108 is filled with water.

The hydrodynamic energy generation 100 may further be mechanically stationed and fixed steady in place, such as attaching the system to one or more concrete pads, metal constructions or any other fixed support 121, as shown in FIG. 1. In one embodiment, the housing 108 includes a filter coupled to the valves at the top of the housing 108, wherein the filter eliminates unwanted debris from the water flowing through the valves. It is desirable to eliminate the intake of debris and other unwanted material so as to reduce or eliminate clogs and other malfunctions.

Figure 3:
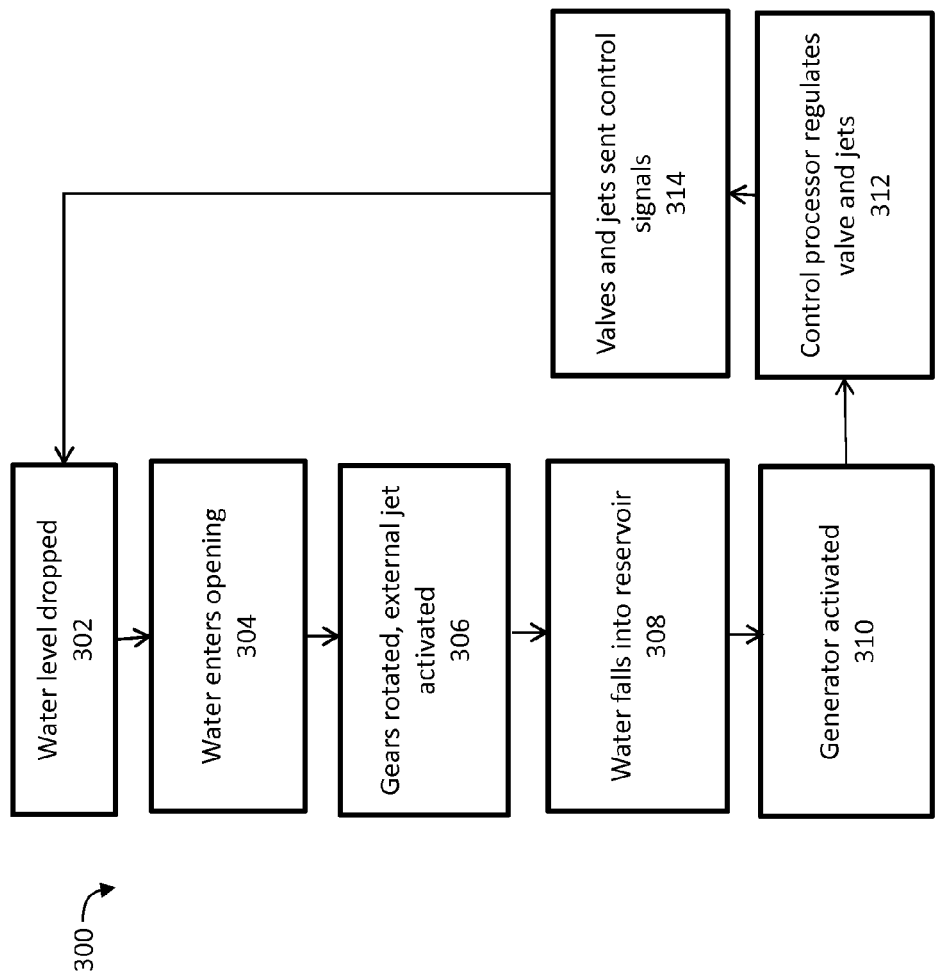
FIG. 3 is a flow chart depicting the method of the hydrodynamic energy generation system, in accordance with one embodiment.

FIG. 3 is a flow chart depicting the method 300 of the hydrodynamic energy generation system 100, in accordance with one embodiment. In step 302, jet 119 uses external power source 128 to lower the water level within housing 108 to an adequate water level 125, such as a level that reduces or eliminates buoyancy forces acting on the system 100 due to the body of water in which the system 100 is submerged. In step 304 the water from the body of water enters the openings 102, 112 of the system 100, thereby activating jet 115 such that the gears 116 turn, thereby ready to take over as an energy source to rotate jet 119. The water that traveled through the gears 106 falls into the reservoir 120 through a virtual space where there may be no buoyancy forces opposing the gravity force that is driving the water flow. In step 306, the gear 116 thereby powers jet 119. In step 308, water enters opening 102 and in step 310, the generator 107 is activated due to said entrance of water.

In step 312, the control processor 118 reads data from the first and second sensors 126, 127, the generator and jets 115 and 119 and in step 314 sends control signals to the valves 104, 114 and the jet 119, wherein the control signals are configured to activate the valves 104, 114 to regulate an amount of water that enters the openings 102, 112 at the top of housing 108, and to activate the jet 119 to regulate an amount of water maintained in the reservoir 120, such that the system 100 is maintained at neutral buoyancy. The control signals sent to the valves 104, 114 and the jet 119, may further be configured such that the amount of water 125 within reservoir 120 is not to be allowed to rise over a predefined line, for the purpose of substantially reducing or eliminating buoyancy forces acting on the system 100 components due to the body of water in which the system 100 is submerged. The control signals sent to the valves 104, 114 and the jet 119, may also be configured such that the amount of water being pumped out of the housing 108 is equal to or greater than the amount of water entering the housing 108 via the openings 102, 112, so as to avoid a situation where the entire volume of housing 108 is filled with water.

In one embodiment, the control processor 118 receives data from first and second sensors 126, 127, the generator, and jets 115 and 119 and uses a formula to calculate how much the valves 104, 114 must be opened or closed, and how much the jet 119 must be adjusted in order to: 1) substantially reduce or eliminate buoyancy forces acting on the system 100, and/or 2) insure that the amount of water being pumped out of the housing 108 is equal to or greater than the amount of water entering the housing 108 via the openings 102, 112. Based on said calculation, the processor 118 creates data commands to send to valves 104, 114 and the jet 119, which are transmitted in step 312.

Figure 5:
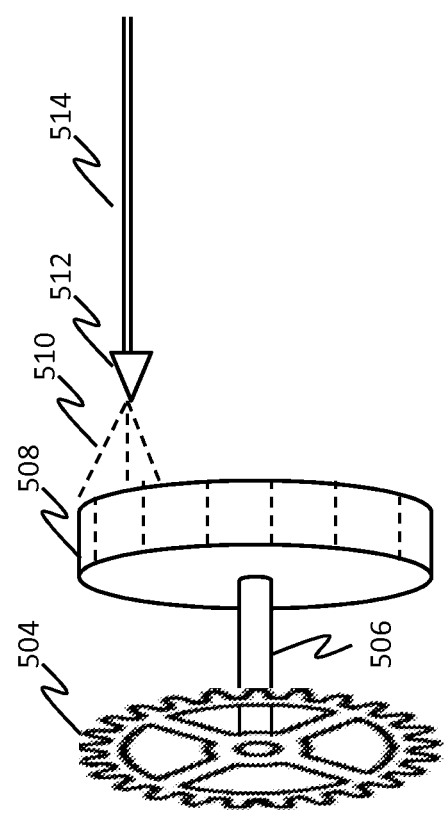
FIG. 5 is a block diagram illustrating a gear system and water wheel of the hydrodynamic energy generation system, in accordance with yet another alternative embodiment.

FIG. 5 is a block diagram illustrating a gear 504 and water wheel 508 of the hydrodynamic energy generation system 100, in accordance with yet another alternative embodiment. FIG. 5 provides more detail on how gear 116 of FIG. 1 is powered by jet 115. FIG. 5 shows that the gear 504 may be connected to a water wheel 508 concentric with the gear 504, via a shaft 506 extending along the centerline of the gear 504 and water wheel 508. The water jet 512 expels a water stream 510 (or another liquid) at high speed towards the water wheel 508, which rotates or turns, thereby moving the shaft 506, and moving the gear 504. Water supply line 514 provides water to the jet 512.

Water jet 512, which may comprise a nozzle, may rotate or change its position or orientation so as to change how the water 510 (or other liquid it expels) hits or interacts with the water wheel 508. In one example, the water jet 512 may rotate or change its position or orientation such that the water stream 510 hits or interacts with the water wheel 508 near the outer circumference of the water wheel 508, so as to maximize the torque experienced by the water wheel 508 as a result of the impact of the water stream 510. In another example, the water jet 512 may rotate or change its position or orientation such that the water stream 510 hits or interacts with the water wheel 508 near the center of the water wheel 508, so as to minimize the torque experienced by the water wheel 508 as a result of the impact of the water stream 510. As explained above, the control processor 118 is configured for sending control signals to the water jets, wherein the control signals are configured to move the jets (i.e., their positions orientations or rotations), activate any valves in the jets to regulate an amount of water that exits the jets, and activate any valves in the jets to regulate pressure of water that exits the jets. This allows the control processor 118 to control or manage how much energy is produced by the generator 502.

Figure 4:
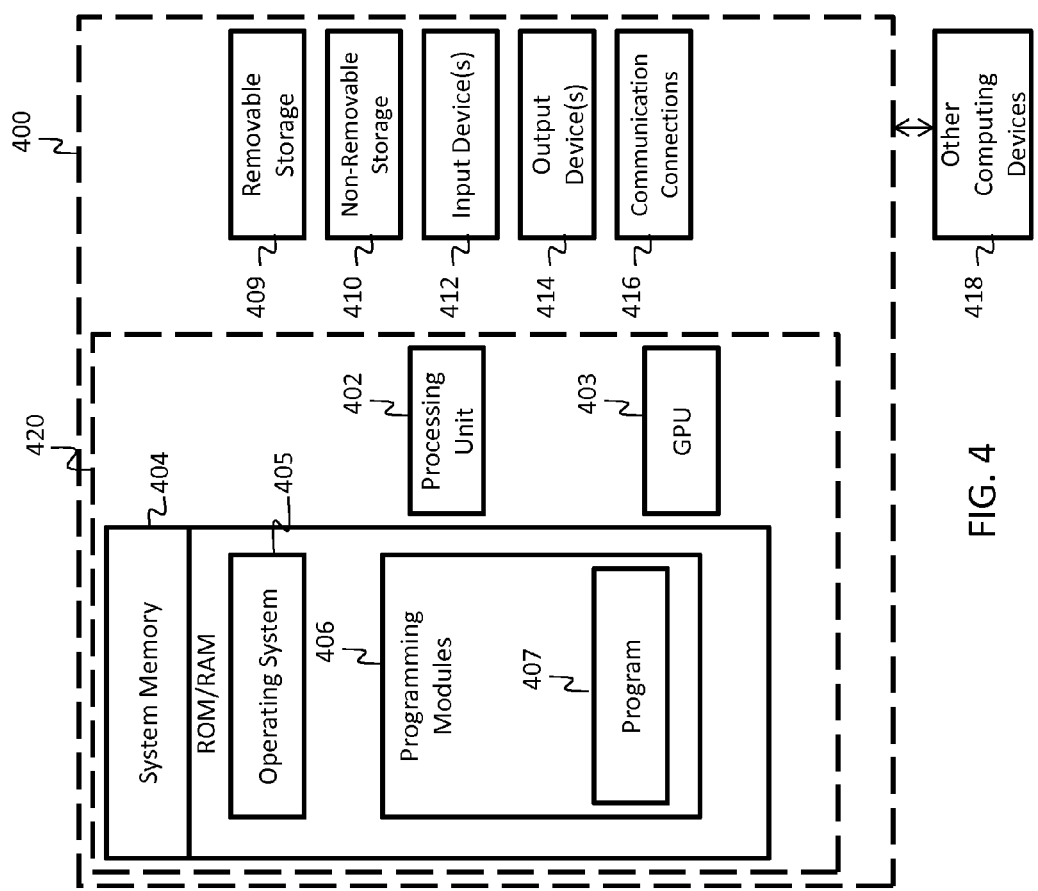
FIG. 4 is a block diagram of a system including an example computing device and other computing devices.

FIG. 4 is a block diagram of a system including an example computing device 400 and other computing devices. Consistent with the embodiments described herein, the aforementioned actions performed by computer 118 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the method shown in FIG. 3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIG. 3 above. Computing device 402 may also include a graphics processing unit 403, which supplements the processing capabilities of processor 402 and which may execute programming modules 406, including all or a portion of those processes and methods shown in FIG. 3 above. The aforementioned processes are examples, and processing units 402, 403 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A hydrodynamic energy generation system, comprising:
   a housing comprising a hollow interior, a first opening at a top of the housing and a second opening below the first opening, wherein the housing is at least partially submerged in a body of water;
   a first valve coupled to a top of the housing for regulating an amount of water that enters the first opening at the top and falls into the housing, wherein the first valve is located at or under a water line;
   a generator that produces electrical power when a turbine is moved by water entering from the first valve;
   a reservoir located below the generator and within the housing, wherein the reservoir holds the water that has traveled via the generator;
   a second valve coupled to the housing for regulating an amount of water that enters the second opening and falls into the housing, wherein the second valve is located under a water line;
   an internal water jet that discharges water from the second valve;
   a gear located adjacent to the internal water jet and within the housing, wherein the gear is mechanically coupled to an external water jet, wherein the gear is moved by water expelled from the internal water jet and wherein the gear and the external water jet are both at least partially powered by an external power source;
   wherein the external water jet is located within the reservoir, wherein the gear powers the external water jet, and wherein the external water jet is configured for expelling water from the reservoir to an exterior of the reservoir; and
   a coupling for conductively coupling the hydrodynamic energy generation system with the external power source.

2. The hydrodynamic energy generation system of claim 1, wherein mechanically coupled comprises one or more gears that translate rotational energy.

3. The hydrodynamic energy generation system of claim 2, wherein mechanically coupled further comprises one or more shafts that translate rotational energy.

4. The hydrodynamic energy generation system of claim 3, wherein the second opening is located at a height lower than the first opening.

5. The hydrodynamic energy generation system of claim 4, wherein the external water jet includes components that are located outside the reservoir.

6. The hydrodynamic energy generation system of claim 5, further comprising a first sensor for detecting water flow through the housing.

7. The hydrodynamic energy generation system of claim 6, further comprising a second sensor for detecting a water level in the reservoir.

8. The hydrodynamic energy generation system of claim 7, further comprising a control processor communicatively coupled with the first and second valves, the water jets, the first and second sensors, the first, second and third water jets and the generator.

9. The hydrodynamic energy generation system of claim 8, wherein the control processor is configured for:
   reading data from the first and second sensors; and
   sending control signals to the first and second valves and the water jets, wherein the control signals are configured to adjust the valves to regulate an amount of water that enters the openings at the top, and to activate the external water jet to regulate an amount of water maintained in the reservoir.

10. The hydrodynamic energy generation system of claim 9, wherein the control processor is configured for:
    reading data from the second generator; and
    sending control signals to the external water jet, wherein the control signals are configured to adjust one or more of the following for the water jet: an amount of water jettisoned, a rate of water jettisoned, a pressure of water jettisoned, an angle of rotation of the water jet and a position of the water jet.

11. A hydrodynamic energy generation system, comprising:
    a housing comprising a hollow interior, a first opening at a top of the housing and a second opening below the first opening, wherein the housing is at least partially submerged in a body of water;
    a first valve coupled to a top of the housing for regulating an amount of water that enters the first opening at the top and falls into the housing, wherein the first valve is located at or under a water line;
    a generator that produces electrical power when a turbine is moved by water entering from the first valve;
    a reservoir located below the generator and within the housing, wherein the reservoir holds the water that has traveled via the generator;
    a second valve coupled to the housing for regulating an amount of water that enters the second opening and falls into the housing, wherein the second valve is located under a water line;
    an internal water jet that discharges water from the second valve;
    a gear located adjacent to the internal water jet and within the housing, wherein the gear is mechanically coupled to an external water jet, wherein the gear is moved by water expelled from the internal water jet and wherein the gear and the external water jet are both at least partially powered by an external power source;
    wherein the external water jet is located within the reservoir, wherein the gear powers the external water jet, and wherein the external water jet is configured for expelling water from the reservoir to an exterior of the reservoir;
    a coupling for conductively coupling the hydrodynamic energy generation system with the external power source; and
    a control processor communicatively coupled with the valves, the water jets, and the generator, the control processor for controlling said valves and said water jets.

12. The hydrodynamic energy generation system of claim 11, wherein mechanically coupled comprises one or more gears that translate rotational energy.

13. The hydrodynamic energy generation system of claim 12, wherein mechanically coupled further comprises one or more shafts that translate rotational energy.

14. The hydrodynamic energy generation system of claim 13, wherein the second opening is located at a height lower than the first opening.

15. The hydrodynamic energy generation system of claim 14, wherein the external water jet includes components that are located outside the reservoir.

16. The hydrodynamic energy generation system of claim 15, further comprising a first sensor for detecting water flow through the housing.

17. The hydrodynamic energy generation system of claim 16, further comprising a second sensor for detecting the amount of water in the reservoir.

18. The hydrodynamic energy generation system of claim 17, wherein the control processor is configured for:
    reading data from the first and second sensors; and
    sending control signals to the first and second valves and the water jets, wherein the control signals are configured to adjust the valves to regulate an amount of water that enters the openings at the top, and to activate the external water jet to regulate an amount of water maintained in the reservoir.

19. The hydrodynamic energy generation system of claim 18, wherein the control processor is configured for:
    reading data from the generator; and
    sending control signals to the external water jet, wherein the control signals are configured to adjust one or more of the following for the water jet: an amount of water jettisoned, a rate of water jettisoned, a pressure of water jettisoned, an angle of rotation of the water jet and a position of the water jet.

* * * * *